US009392909B2

(12) United States Patent
Kim

(10) Patent No.: US 9,392,909 B2
(45) Date of Patent: Jul. 19, 2016

(54) JUICER HAVING SMOOTHIE MAKING FUNCTION

(76) Inventor: Young Ki Kim, Gyeongsangnam-do (KR)

( * ) Notice: Subject to any disclaimer, the term of this patent is extended or adjusted under 35 U.S.C. 154(b) by 566 days.

(21) Appl. No.: 13/522,878

(22) PCT Filed: Sep. 14, 2011

(86) PCT No.: PCT/KR2011/006768
§ 371 (c)(1),
(2), (4) Date: Jul. 18, 2012

(87) PCT Pub. No.: WO2012/036454
PCT Pub. Date: Mar. 22, 2012

(65) Prior Publication Data
US 2012/0291638 A1    Nov. 22, 2012

(30) Foreign Application Priority Data

Sep. 17, 2010  (KR) .................. 10-2010-0091563
Sep. 9, 2011   (KR) .................. 10-2011-0092158

(51) Int. Cl.
*A23N 1/02*     (2006.01)
*A47J 43/042*   (2006.01)
(Continued)

(52) U.S. Cl.
CPC .............. *A47J 43/042* (2013.01); *A47J 19/025* (2013.01); *A47J 19/027* (2013.01); *A47J 43/046* (2013.01)

(58) Field of Classification Search
CPC ...... A47J 19/027; A47J 43/042; A47J 43/046
USPC ............ 99/513, 510, 511; 100/117, 112, 126, 100/127, 131, 133, 134; 241/24.26, 166–7; 366/205
See application file for complete search history.

(56) References Cited

U.S. PATENT DOCUMENTS 2,573,585 A * 10/1951 McBean ........................ 100/117
3,106,948 A * 10/1963 Staeger ........................... 99/512
(Continued)

FOREIGN PATENT DOCUMENTS

CN    101355897    1/2009 .............. A47J 19/06
CN    201295120 Y  8/2009 .............. A47J 19/00
(Continued)

OTHER PUBLICATIONS

Korean Patent Office, Decision to Appeal Korean Application No. 10-2010-0091563, mailed Dec. 31, 2012, 45 pages.
(Continued)

*Primary Examiner* — David Angwin
*Assistant Examiner* — Frederick Calvetti
(74) *Attorney, Agent, or Firm* — Sunstein Kann Murphy & Timbers LLP

(57) ABSTRACT

A juicer having a smoothie making function including: a lid having a feed tube; a feed screw having a rotating shaft and feeding input food downwards while cutting, crushing and squeezing the food; a housing having a juice outlet and a residue outlet on an outer surface, with a housing discharge hole formed in the bottom of the housing and communicating with the residue outlet; a net drum having an entirely or partially meshed sidewall, with a net drum discharge hole formed in the net drum and communicating with the residue outlet; a motor unit having a housing seat and a drive shaft for rotating the feed screw; and a juice control unit for opening or closing the juice outlet. While in operation, input food circulates through the upper and lower portions of the net drum while being cut, crushed or squeezed, and residue collects in the net drum.

6 Claims, 16 Drawing Sheets

(51) Int. Cl.
*A47J 19/02* (2006.01)
*A47J 43/046* (2006.01)

(56) References Cited

U.S. PATENT DOCUMENTS

| | | | | |
|---|---|---|---|---|
| 3,831,516 A * | 8/1974 | Johnson | | 100/116 |
| 8,091,473 B2 | 1/2012 | Kim | | 99/10 |
| 2006/0191425 A1 | 8/2006 | Chang | | 99/511 |
| 2009/0049998 A1 * | 2/2009 | Kim | | 99/510 |
| 2009/0235831 A1 * | 9/2009 | Nisonov | | 100/112 |
| 2011/0083565 A1 * | 4/2011 | Backus | | 99/511 |
| 2011/0083566 A1 * | 4/2011 | Backus | | 99/511 |

FOREIGN PATENT DOCUMENTS

| | | | | |
|---|---|---|---|---|
| JP | 3116010 | 11/2005 | | A47J 19/00 |
| KR | 1020020012943 | 2/2002 | | A47J 43/07 |
| KR | 1020040011432 | 5/2004 | | A47J 43/07 |
| KR | 10-0622528 B1 | 4/2006 | | A47J 43/07 |
| KR | 1020060035095 | 4/2006 | | A47J 43/07 |
| KR | 20-0416641 Y1 | 5/2006 | | A47J 19/00 |
| KR | 10-2006-0101848 A | 9/2006 | | A47J 19/06 |
| KR | 1020060101848 | 9/2006 | | A47J 19/06 |
| KR | 1007554401 B1 | 8/2007 | | A47J 19/06 |
| KR | 10-0755440 B1 | 9/2007 | | A47J 19/06 |
| KR | 10-2008-0090220 A | 10/2008 | | A47J 43/04 |
| KR | 20080090220 | 10/2008 | | A47J 43/04 |
| KR | 2020100005489 | 5/2010 | | A47J 19/06 |
| TW | M261154 | 9/1993 | | A47J 29/00 |
| TW | M289588 | 4/2006 | | A23L 3/00 |
| TW | M392197 | 11/2010 | | E03D 9/02 |
| WO | WO 2007/148872 | 12/2007 | | A47J 19/06 |

OTHER PUBLICATIONS

Korean Patent Office, Office Action for Korean Application No. 10-2011-092158, mailed Nov. 22, 2012, 4 pages.
Taiwan Patent Office, Office Action for Taiwan Application No. 100144010, mailed Aug. 28, 2013, 10 pages.
Korean Intellectual Property Office, International Search Report for International Application No. PCT/KR2011-006768, mailed Apr. 9, 2012, 8 pages.
Chinese Patent Office with English language translation, First Office Action for Chinese Application No. 201180003669.0, mailed Nov. 18, 2013, 10 pages.
Chinese Patent Office with English language translation, Second Office Action for Chinese Application No. 201180003669.0, mailed May 14, 2014, 11 pages.
Japanese Patent Office, Office Action for Japanese Application No. 2012-547039, mailed Aug. 21, 2013, 2 pages.
European Patent Office, Extended European Search Report for European Application No. 11825414.3, mailed May 13, 2013, 6 pages.

* cited by examiner

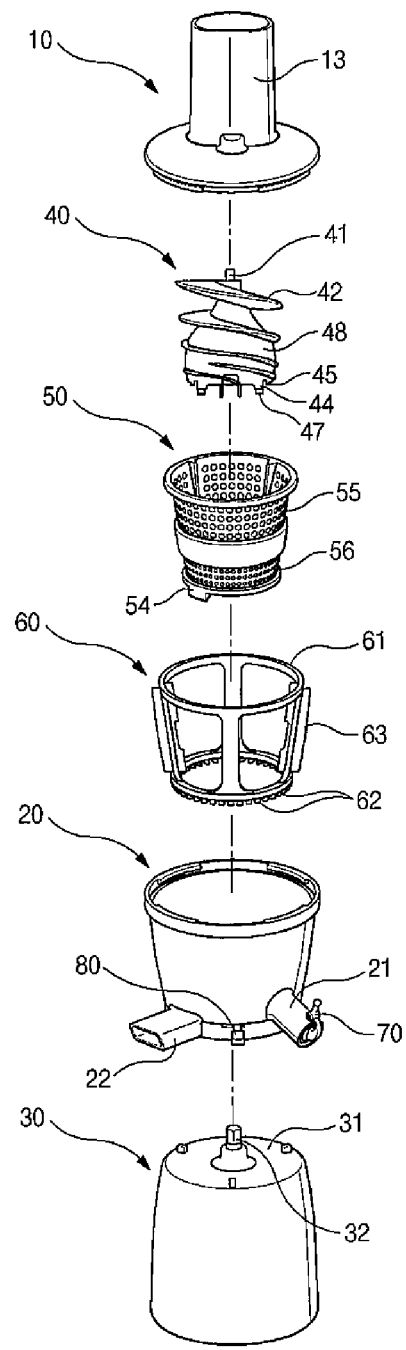

JUICER HAVING SMOOTHIE MAKING FUNCTION

RELATED APPLICATIONS

The present application is a national phase entry of PCT/KR2011/006768, entitled "COMBINED SMOOTHIE MAKER AND JUICER" and filed Sep. 14, 2011. PCT/KR2011/006768 claims priority to Korean Patent Application No. 10-2011-0092158, filed Sep. 9, 2011, and Korean Patent Application No. 10-2010-0091563, filed Sep. 17, 2010.

BACKGROUND OF THE INVENTION

1. Field of the Invention

The present invention relates, in general, to juicers having a smoothie making function and, more particularly, to a juicer which can make green vegetable juice, fruit juice and/or soybean milk from vegetables, fruits or soybeans, and can easily make smoothies without leaving behind residue, such as fiber, in the smoothies even when whole vegetables or whole fruits are put into the juicer without having been cut.

2. Description of the Related Art

An existing juicer is an appliance that makes juice using centrifugal separation after a raw material is put into a feed tube, by pressing and crushing the material at high speed. However, such a juicer is problematic in that the characteristic taste and nutrients of a fruit may be destroyed during the high-speed crushing process, it is difficult to make green vegetable juice from vegetables having stems and leaves, it is difficult to make juice from fruits that are highly viscous, such as kiwis or strawberries, and in addition it is almost impossible to make soybean milk from soybeans. Further, if a user continues to make juice, the juicer must be frequently disassembled and washed to remove residue from the mesh.

A food processing apparatus essentially requires cleanliness and smooth washing or cleaning. If food remains behind in the apparatus or if the apparatus becomes dirty, the food will spoil easily and bacteria will breed. Hence, internal components of the apparatus need to be easy to disassemble and clean.

Korean U.M. Registration No. 190676 was filed by the inventor of this invention and pertains to a juice extractor having a grinding function. The juice extractor is configured so that a long feed screw is horizontally assembled with a drum, together with an extracting net and a drum cap, to be coupled to a sidewall of a driving unit. The overall length thereof is long, and the extractor performs a juice extracting operation when a raw material is being slowly fed horizontally after being put into a feed tube.

Thus, the juice extractor has drawbacks in that a wide space is required when the extractor is being used or is in storage, and in that the extracting speed is slow because a raw material is extracted while moving horizontally, and thick highly viscous juice does not flow down well, but may collect in the drum. Further, the juice extractor is problematic in that the feed screw has no rotating shaft on an end thereof, so that the end of the feed screw without the rotating shaft may shake and collide with a blade on an inner wall of the extracting net while rotating, thus causing noise and abrasion.

Further, such a juice extractor must be disassembled and washed after being used, to overcome a hygienic problem caused by the remaining food. Thus, the juice extractor requires a configuration that minimizes inconvenience during disassembly and assembly. Further, the juice extractor is in need of further improvement to achieve durability during the use of the extractor.

In order to solve the problems, Korean Patent No. 793852 has been proposed, which deals with a juice extractor. This was filed by the inventor of this invention after which it was registered. According to the cited document, the juice extractor can make soybean milk from soybeans using the principle of a millstone which grinds, presses and crushes the beans, and can make fruit juice from fruits having high viscosity, such as tomato, kiwis or strawberries, by rubbing, pressing and crushing the fruits over a grater. Since a housing of the juice extractor is vertically coupled to an upper portion of a driving unit, a wide space is not required to use or store the extractor in. Further, since the position of a juice outlet is at a more upper position compared to the prior art, it is possible to utilize various kinds of cups.

Due to the above-mentioned structural characteristics, the juice extractor disclosed in Korean Patent No. 793852 is advantageous in that it can be easily washed. However, the juice extractor must be disassembled, washed and assembled in order to solve a hygienic problem which may be caused by food left behind in the juice extractor or when making different kinds of juices in succession.

In an effort to solve the above-mentioned problems, Korean Patent No. 755440, which was filed by the inventor of this invention and then was registered, proposes a juice extractor with a structure that is an improvement over that of the juice extractor disclosed in Korean Patent No. 793852. To realize easy and simple washing, this juice extractor is provided with a brush for continuously brushing both the outer surface of the net drum and the inner surface of the housing. However, this juice extractor is problematic in that, when the juice extractor is operated while water is being put into the housing through the feed tube, the brush is rotated and washes the lower portions of both the housing and the net drum; however, in the above state, the water does not reach the upper portions, but is discharged to the outside of the housing through the juice outlet, so that the upper portions may not be washed.

Further, in the juice extracting operation of the juice extractor disclosed in Korean Patent No. 755440, as shown in FIG. 6, tough fiber included in the residue is cut by the rotation of the feed screw 200 at the location between a feed screw 200 and a net drum bottom ring 340 and is discharged to a residue outlet 570 through a net drum discharge hole 360 formed in the lower end of the net drum bottom ring 340. However, when the residue includes lots of tough fiber, uncut tough fiber residue may be left behind between the feed screw 200 and the net drum bottom ring 340. The uncut tough fiber residue may slightly push the feed screw 200 upwards and form a space between a discharge step 225 formed in the lower surface of the feed screw 200 and the net drum bottom ring 340 having the net drum discharge hole 360, Therefore, the uncut tough fiber residue gradually collects in the space and the residue having the uncut tough fiber gradually closes the net drum discharge hole 360, so that the residue may not be smoothly discharged through the hole and this disturbs the continuous juice extraction, thereby bringing the juice extraction process to a halt.

Further, some users need smoothies made from vegetables and fruits. However, a conventional smoothie maker cannot make smoothies from vegetables having lots of fiber. Additionally, to make smoothies from fruits using the conventional smoothie maker, the rinds and seeds of the fruits must be removed and this is inconvenient to users. Further, effective components of fruits are more abundantly present in the rinds and seeds than in the flesh of fruits and, accordingly, it is not good to make smoothies from fruits after removing the rinds and seeds.

SUMMARY OF THE INVENTION

The present invention is directed to a juicer having a smoothie making function, which can make soft mixed smoothies by cutting, crushing and squeezing vegetables having lots of fiber or whole fruits in such a way that inedible residue, such as fiber, is isolated in a net drum and an edible material of the vegetables or fruits is continuously circulated between the interior and exterior of a net drum until the edible material becomes a part of the soft mixed smoothies, and which can efficiently discharge the residue through a net drum discharge hole and, further, can frequently discharge the residue from the net drum when necessary, thereby repeatedly making smoothies, and, further, can be operated to wash the interior elements thereof with water charged in the housing, thereby allowing the elements to be efficiently washed without having to disassemble the juicer.

In order to achieve the above object, according to one aspect of the present invention, there is provided a juicer having a smoothie making function, including: a lid having a feed tube for putting food into the juicer; a feed screw for feeding the input food downwards while cutting, crushing and squeezing the food, with a rotating shaft being vertically provided in the feed screw; a housing assembled to a lower end of the lid, with a juice outlet and a residue outlet being formed on an outer surface of the housing in such a way that the juice outlet and the residue outlet are spaced apart from each other, the feed screw being rotatably placed in the housing and a housing discharge hole being formed in a bottom of the housing such that the housing discharge hole communicates with the residue outlet; a net drum surrounding the feed screw and having an entirely or partially meshed sidewall, with a net drum discharge hole being formed in the net drum and communicating with the residue outlet; a motor unit provided with a seat on an upper end thereof for seating the housing thereon, with a drive shaft provided in a center of the seat and connected to the rotating shaft, thereby rotating the feed screw; and a juice control unit for opening or closing the juice outlet. During an operation of the juicer with the juice outlet being closed, food repeatedly and continuously circulates through the upper and lower nets of the net drum while being cut, crushed or squeezed. However, in such a case, residue including fiber can be isolated in the net drum.

In some embodiments, the net drum discharge hole may be formed in a lower surface of the net drum, and the juicer may further include: a residue packing mounted to a lower portion of the net drum and opening or closing the net drum discharge hole or the residue outlet.

In some embodiments, the net drum discharge hole may be formed in a lower surface of the net drum, and the juicer may further include: a residue control unit for opening or closing the net drum discharge hole or the residue outlet.

In some embodiments, the net drum discharge hole may be formed on a lower portion of a sidewall of the net drum, and the juicer may further include: a residue control unit for opening or closing the net drum discharge hole or the residue outlet.

In some embodiments, the juicer may further include: a discharge guide surface which is bent downwards, the discharge guide surface being mounted to a predetermined lower portion of an outer surface of the net drum at a location around the net drum discharge hole and forming a channel for communicating the net drum discharge hole with the housing discharge hole.

Further, in some embodiments, the residue outlet may be provided with an adjustment hole at a location adjacent to the net drum discharge hole, and the residue control unit may include: a control lever rotatably mounted to a lower surface of the housing; and a rotary panel extending from the control lever and inserted in the adjustment hole so as to open or close the net drum discharge hole or the residue outlet.

Further, in some embodiments, the net drum discharge hole may be provided with a residue packing, the residue packing being configured to be elastically deformed and opening or closing the net drum discharge hole, and the rotary panel may come into close contact with a lower surface of the residue packing, thereby controlling elastic deformation of the residue packing.

In some embodiments, the juicer may further include: a brush installed between the housing and the net drum and rotated in conjunction with the feed screw and brushing an inner surface of the housing or an outer surface of the net drum.

In some embodiments, the juicer may further include: a brush installed between the housing and the net drum and rotated in conjunction with an intermediate gear rotated by a secondary shaft connected to the motor unit.

Further, in some embodiments, the juice control unit may include: a rotary unit rotatably connected to the juice outlet; and a closure unit provided in an end of the rotary unit and configured to close an end of the juice outlet.

BRIEF DESCRIPTION OF THE DRAWINGS

The above and other objects, features and other advantages of the present invention will be more clearly understood from the following detailed description when taken in conjunction with the accompanying drawings, in which:

FIG. 1A is an exploded perspective view illustrating a juicer having a smoothie making function according to a first of the present invention;

DETAILED DESCRIPTION OF THE INVENTION

Figure 1B:
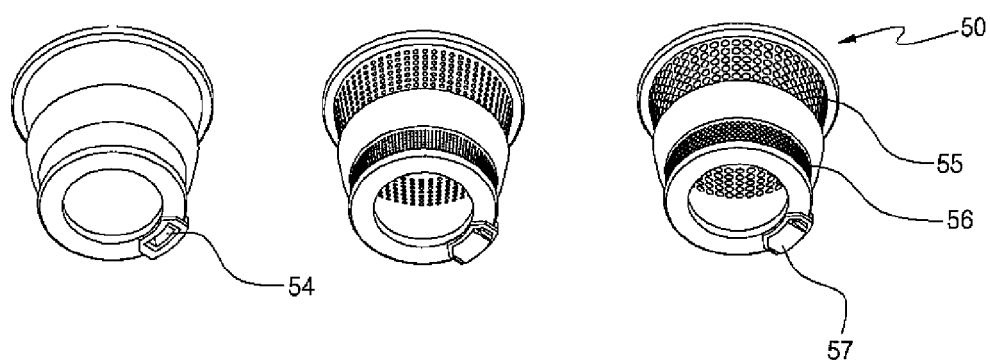
FIG. 1B is a perspective view illustrating a plurality of net drums according to different embodiments of the present invention.
Figure 1C:
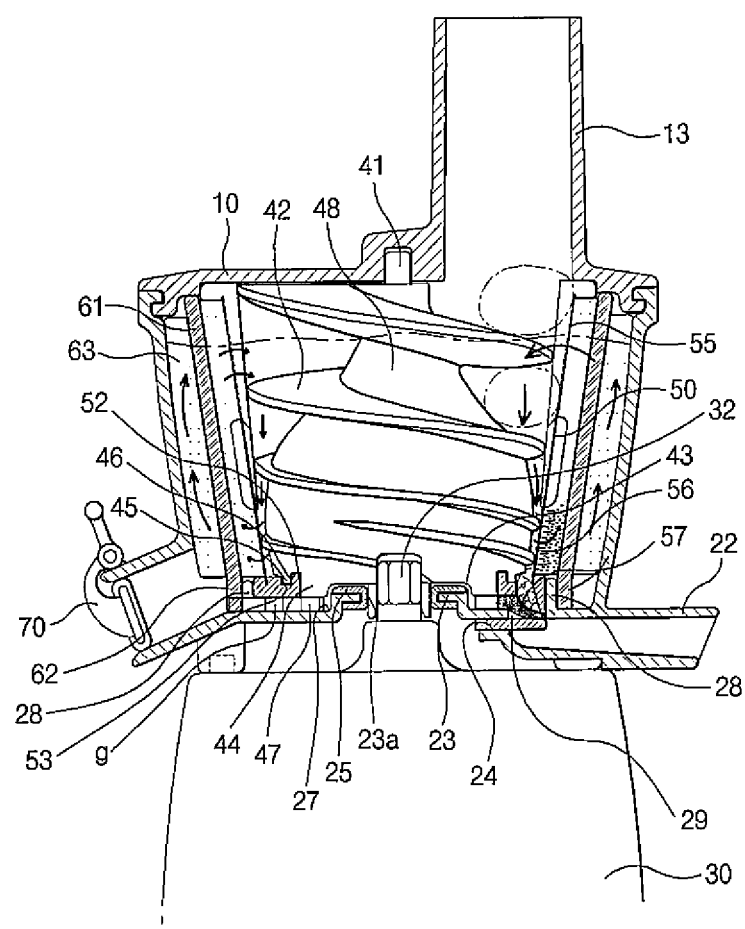
FIG. 1C is a sectional view illustrating the operation of the juicer shown in FIG. 1A.

FIG. 1A is an exploded perspective view illustrating a juicer having a smoothie making function according to a first of the present invention. FIG. 1B is a perspective view illustrating a plurality of net drums according to different embodiments of the present invention. FIG. 1C is a sectional view illustrating the operation of the exemplary juicer shown in FIG. 1A.

The juicer 1 having the smoothie making function according to the present invention includes a lid 10, a feed screw 40, a housing 20, a net drum 50, a motor unit 30 and a juice control unit 70. Further, the juicer 1 having the smoothie making function, according to some embodiments of the present invention, may include a brush 60. Further, when a residue outlet 22 is formed in the housing 20, a residue control unit 80 may be provided in the juicer 1.

As will be described hereinafter, the juicer 1 having the smoothie making function may be configured such that it may be used as a juicer, which can extract juice from fruits and can discharge juice and residue separately, and may be used as a smoothie maker.

Here, in some embodiments, the smoothie maker is a device for making smoothies which are produced by mixing frozen fruits or frozen vegetables with milk, soybean milk, etc.

Hereinbelow, the construction of elements constituting the juicer 1 having the smoothie making function according to some embodiments of the present invention will be described in detail to aid the comprehension of the present invention.

The lid 10 is a part through which a raw material, such as vegetables, fruits, etc., is put into the juicer 1 having the smoothie making function of some embodiments of the present invention. The lid 10 is provided with a feed tube 13 and forms an upper part of the juicer 1 having the smoothie making function according to some embodiments of the present invention. The lid 10 is configured such that a predetermined amount of raw material can be continuously put into the juicer. Therefore, the structure of the lid 10 is not completely isolated from the outside, but the top of the lid 10 is partially open as shown in FIG. 1A.

The housing 20 is closely assembled with the lower end of the lid 10.

The housing 20 has a bowl shape and functions to collect juice and discharge the juice to the outside of the juicer.

The housing 20 is provided with both a juice outlet 21 and a residue outlet 22 on the outer surface thereof, so that the juice outlet 21 discharges juice and the residue outlet 22 discharges residue from which the juice has been strained.

In the drawings, for example, FIG. 1A, the housing 20 having the residue outlet 22 is illustrated. However, it should be understood that the residue outlet 22 may not be formed in the housing 20. In the above state, the residue from which juice has been strained in the housing 20 will be collected on the bottom of the net drum 50. When the operation of the juicer has finished, the residue may be removed from the net drum 50 after the feed screw 40 is removed from the net drum 50.

In some embodiments, to maximize the function of the juicer that can be used both as a juicer and as a smoothie maker, the residue outlet 22 may be provided in the juicer 1 having the smoothie making function. Therefore, it should be understood that the juicer described in the following description may be a type provided with the residue outlet 22 if there is no specific expression.

The juice control unit 70 is configured to open or close the juice outlet 21. Further, the residue control unit 80 is provided in a residue discharge path. The residue control unit 80 is configured to open or close a net drum discharge hole 54 and to open or close the residue outlet 22 formed in the housing 20. Both the juice control unit 70 and the residue control unit 80 will be described in detail later herein.

Juice flowing down along the side surface of the net drum 50 is discharged through the juice outlet 21 and the residue from the lower end of the net drum 50 is discharged through the residue outlet 22, so that the juice outlet 21 and the residue outlet 22 are separately formed.

As described above, the net drum 50 functions to divide the juice outlet 21 from the residue outlet 22. In the housing 20, the space defined outside the net drum 50 communicates with the juice outlet 21 and the space defining the interior of the net drum 50 communicates with the residue outlet 22. In other words, during the process of crushing and squeezing fruits, etc. put into the net drum 50, both the feed screw 40 and the net drum 50 are operated along with a screw pump, so that juice is discharged from the net drum 50 to the juice outlet 21 and residue remains in the net drum 50. The residue is then discharged from the net drum 50 to the outside sequentially through the net drum discharge hole 54 and the residue outlet 22.

A waterproof cylinder 23 may be provided in the housing 20 in such a manner that it protrudes upwards from the central area of the bottom of the housing 20, with a through hole 23a formed through the center of the waterproof cylinder 23. The lower end of a rotating shaft 41 is inserted downwards through the through hole 23a and is connected to a drive shaft 32. The waterproof cylinder 23 protrudes upwards from the bottom of the housing 20, so that it is possible to prevent juice from flowing into a motor unit 30 through the through hole 23a.

Further, a through-hole packing 25 made of rubber or silicone is formed in the through hole 23a, thus more efficiently preventing the juice from flowing into the motor unit 30.

A juice discharge channel 27 may be formed in the bottom of the housing 20 at a location right adjacent to the edge of the waterproof cylinder 23. The juice discharge channel 27 is depressed downwards so that the lower end of the feed screw 40 is rotatably inserted into the juice discharge channel 27.

A circular guide step 28 may be formed between the juice discharge channel 27 and a wall of the housing 20 in such a way as to protrude upwards. The lower end of the net drum 50 is seated on the bottom surface inside the guide step 28. The guide step 28 and the edge of the lower end of the net drum 50 are formed to conform to each other.

The bottom surface of the housing 20 is divided into inner and outer spaces by the guide step 28. The feed screw 40 and the net drum 50 are positioned in the inner space, while most of the juice is collected in the outer space prior to being discharged. The juice outlet 21 is formed on the edge of the lower end of the housing 20 and discharges the juice. The juice outlet 21 may be inclined slightly downwards to prevent the juice from collecting.

A housing discharge hole 29 is formed downwards through the bottom surface of the housing 20 such that the housing discharge hole 29 is defined inside the guide step 28. The residue outlet 22 is connected to the housing discharge hole 29, so that the residue remaining after the juice is strained is discharged through the residue outlet 22. That is, the residue outlet 22 extends from the housing discharge hole 29 to outside the housing 20.

The net drum discharge hole 54 is formed in the lower end of the net drum 50 such that the hole 54 is aligned with the housing discharge hole 29. The separated residue passes sequentially through the net drum discharge hole 54 and the housing discharge hole 29 prior to being discharged via the residue outlet 22.

A residue packing 57 made of rubber or silicone may be interposed in the net drum discharge hole 54 in such a way that the packing 57 can close the net drum discharge hole 54. The residue packing 57 is configured such that, when no external force is applied to the residue packing 57, the packing 57 can close the net drum discharge hole 54 and, in contrast, when an external force is applied to the residue packing 57 (e.g., pressure is applied from an upper portion to a lower portion), the residue packing 57 can be elastically deformed and opens the net drum discharge hole 54.

The residue packing 57 will be described below in detail.

A seat 31 is formed on the top of the motor unit 30, and the drive shaft 32 is provided on a central portion of the seat 31. The motor unit 30 is a part that generates power in the juicer 1 and has a motor and a reduction gear therein.

The lower end of the housing 20 is placed tightly on the seat 31.

The drive shaft 32 is formed on the central portion of the seat 31, and is connected to the motor and the reduction gear in the motor unit 30. The drive shaft 32 is rotated at low speed by the motor and the reduction gear, thus rotating the feed screw 40.

The feed screw 40 is provided with the rotating shaft 41, with a screw body 48 and screw blades 42 provided around the rotating shaft 41.

The upper end of the rotating shaft 41 is supported by the lid 10, while the lower end thereof is connected to the drive shaft 32. A shaft hole is formed in a central portion of a back of the lid so that the upper end of the rotating shaft 41 can be inserted into the shaft hole so as to be supported thereby.

The lower end of the rotating shaft 41 is connected to the drive shaft 32, and the feed screw 40 can be rotated by the rotation of the drive shaft 32. The rotating shaft 41 rotates integrally with the drive shaft 32 without slipping after it is coupled to the drive shaft 32. The drive shaft 32 has the shape of a prism. A recess may be formed in the lower end of the rotating shaft 41 in such a way that the drive shaft 32 can be precisely inserted into the rotating shaft 41.

The screw blades 42 are helically formed around the rotating shaft 41. The entire screw body 48 is thick so as to press and squeeze input food using the junction between the screw blades 42.

The screw body 48 is shaped in such a way that its diameter is small at an upper portion thereof and gradually increases in a direction from the upper portion to the lower portion. Therefore, the upper portion of the screw body 48 is slightly spaced apart from the net drum 50, while the lower portion thereof is close to the net drum 50.

When the feed screw 40 and the net drum 50 are operated in conjunction with the screw pump, the interaction between the screw body 48 and the screw blades 42 squeezes the fruits while naturally feeding the fruits downwards and realizes the repeated circulation of smoothies.

A lower space 43 is formed in the lower portion of the feed screw 40 in such a way that the area of the lower end of the feed screw 40 around the rotating shaft 41 is depressed upwards. When the upper end of the waterproof cylinder 23 is inserted into the lower space 43, the feed screw 40 and the housing 20 can be engaged with each other. Such a configuration can prevent the juice or residue produced by the feed screw 40 from flowing into the motor unit 30 via the through hole 23*a*.

An inner ring 44 is formed on the lower portion of the feed screw 40 such that the inner ring 44 can surround the lower space 43, and an outer ring 45 is further formed outside the inner ring 44. A circular protrusion insert channel 46 is formed between the inner ring 44 and the outer ring 45. A screw gear 47 protrudes downwards from the inner ring 44, is formed to fit the juice discharge channel 27, and is rotatably inserted into the juice discharge channel 27.

An intermediate gear g is rotatably provided on the bottom of the housing 20, and engages with the screw gear 47. When the feed screw 40 rotates, the intermediate gear g engaging with the screw gear 47 rotates. The intermediate gear g serves as a medium for rotating the brush 60 as will be described later herein.

In some embodiments, the brush 60 may be rotated in conjunction with an intermediate gear g that is installed between the housing and the net drum and is rotated by a secondary shaft (not shown) connected to the motor unit.

In some embodiments of the present invention, the brush 60 is rotated in conjunction with the intermediate gear g rotated by the secondary shaft, so that it is possible to appropriately control the rotating speed of the brush according to the kinds of vegetables or fruits separately from the rotating speed of the drive shaft.

The net drum 50 surrounds the feed screw 40, and may have various shapes. FIG. 1B shows various embodiments of the net drum 50. In some embodiments, the net drum may have a closed sidewall or a meshed sidewall having a plurality of meshes.

When the net drum 50 having the plurality of meshes in the sidewall is used, the juicer in some embodiments of the present invention may be used to realize the original function of separating juice through the meshed sidewall of the net drum 50. Meanwhile, when the sidewall of the net drum 50 is closed, the juicer may be used to crush a material, such as garlic. Therefore, the juicer in some embodiments of this invention can be utilized for various purposes. That is, the latter case may be used in a case where it is unnecessary to separate juice from residue and squeezing or crushing is required.

Hereinafter, exemplary embodiments of the net drum 50 having the meshed sidewall will be further described.

The net drum 50 has an upper net 55 in an upper portion thereof, and a lower net 56 in a lower portion thereof. A plurality of meshes is formed in the upper net 55 and the lower net 56. Relatively large meshes are formed in the upper net 55, while small meshes are compactly formed in the lower net 56.

A central portion of a bottom of the net drum 50 is open to define an inner-ring insert hole (reference numeral is omitted). The inner ring 44 provided in the lower portion of the feed screw 40 is inserted into the inner-ring insert hole, and the screw gear 47 is inserted into the juice discharge channel 27.

A circular protrusion 52 is formed around the inner-ring insert hole to protrude upwards. The circular protrusion 52 is inserted into the circular protrusion insert hole 46. The outer ring 45 of the feed screw 40 is inserted into a circular groove 53 of the net drum 50.

Therefore, when the feed screw 40 and the net drum 50 are assembled with each other, both the feed screw 40 and the net drum 50 can be operated along with the screw pump and a predetermined space which is hermetically sealed in the bottom is defined between the outer surface of the feed screw 40 and the inner surface of the net drum 50.

The circular groove 53 is formed in the bottom of the net drum 50 at a location outside the circular protrusion 52. The net drum discharge hole 54 is formed downwards through a predetermined portion of the bottom of the net drum 50. The net drum discharge hole 54 protrudes slightly downwards from the lower end of the net drum 50, and is inserted into the housing discharge hole 29.

When the feed screw 40 and the net drum 50 are operated along with the screw pump in the state in which the feed screw 40 is coupled to the net drum 50, the juice is strained. In the above state, the remaining residue is not discharged through the sidewall of the net drum 50, but moves downwards and accumulates outside the circular groove 53. The residue may be discharged through the net drum discharge hole 54 of the net drum 50. Subsequently, the residue is discharged to the outside through the housing discharge hole 29 and the residue outlet 22.

The brush 60 is installed between the housing 20 and the net drum 50 and brushes the inner surface of the housing 20 and the outer surface of the net drum 50. The brush 60 includes a brush holder 61, a brush gear 62 formed on the lower end of the brush holder 61, and a meshed brush 63 coupled to a side of the brush holder 61.

The brush holder 61 is spaced apart both from the housing 20 and from the net drum 50 without being in close contact with them. The brush gear 62 engages with the intermediate gear g, so that the brush gear 62 rotates when the feed screw 40 rotates. The meshed brush 63 is mounted to the brush holder 61 so that its outer end is in contact with the inner surface of the housing 20 and its inner end is in contact with the outer surface of the net drum 50. Therefore, when the brush 60 rotates, the meshed brush 63 sweeps both the inner surface of the housing 20 and the outer surface of the net drum 50, so that the juice can smoothly flow down.

When the juicer is used as a juicer for extracting juice, the juice and residue can be easily discharged by the operation of the brush 60. When the juicer is used as a smoothie maker, the brush 60 increases the movability of circulating smoothies, thus allowing the smoothies to easily circulate.

Further, an outstanding effect of the brush 60 is its use as a washing means. That is, juice or residue may be caught in or adhere to the net drum 50 and the housing 20. In this case, when the brush 60 rotates with washing water, the residue may be easily removed. Thus, the brush 60 serves as a washing brush. Thus, various embodiments provide a juice extractor having an improved structure which can allow a user to more easily wash the juice extractor.

As described above, the juicer having the smoothie making function according to some embodiments of the present invention is basically configured to separately discharge juice and residue. Hereinbelow, the process of making smoothies using the juicer will be described hereinbelow.

The process of making smoothies using the juicer of some embodiments of the present invention is performed in a state in which the juice control unit 70 and the residue control unit 80 close the juice outlet 21 and the residue outlet 22, respectively.

To make smoothies, a predetermined amount of milk or soybean milk and frozen vegetables or fruits are put into the feed tube 13, and then the juicer is operated. The vegetables or fruits are thus moved downwards while being squeezed and crushed by the feed screw 40 and, in the above state, crushed fine pieces and juice are discharged from the lower net 56 to the outside of the net drum 50. During the process, the feed screw 40 and the net drum 50 are operated along with the screw pump, and the vegetables or fruits are continuously squeezed by the rotating feed screw 40 and the crushed fine pieces and juice are continuously discharged from the lower net 56, so that the smoothies are moved from the lower to the upper portion of the housing 20. Thereafter, the smoothies are introduced from the upper portion of the housing 20 into the net drum 50 through the upper net 55 and are repeatedly processed by the feed screw 40.

During the above-mentioned smoothie making process, residue that cannot pass through the lower net 56 is collected on the bottom of the net drum 50 and only the fruit juice and fine pieces can circulate while passing through the net drum 50, thereby making soft smoothies having no residue.

Further, when the juicer 1 having the smoothie making function according to some embodiments of the present invention is used to make juice having no residue, the juice making process is performed in a state in which the residue outlet 22 is closed by the residue control unit 80. Therefore, the residue is not directly discharged, but is repeatedly crushed and squeezed, so that it is possible to prevent fruit juice from remaining in the residue. Further, the juice extraction rate of the juicer can be maximized by controlling the residue control unit 80.

As described above, when the juicer 1 having the smoothie making function according to some embodiments of the present invention is operated in a state in which the juice outlet 21 is closed by the juice control unit 70, the feed screw 40 having the rotating shaft 41 is rotated by the drive shaft 32 in a state in which the feed screw 40 is placed in the net drum 50 having the entirely or partially meshed sidewall. Therefore, the feed screw 40 moves input food downwards while cutting, crushing and squeezing the food, thereby producing fine pieces and juice. The fine pieces and juice, which are produced by the operation of both the feed screw 40 and the net drum 50 operated in conjunction with the screw pump, are continuously fed to the space defined between the inner surface of the housing 20 and the outer surface of the net drum 50 through the lower net 56 of the net drum 50 and are moved downwards. Further, the fine pieces and juice are moved upwards from the lower portion in the space defined between the inner surface of the housing 20 and the outer surface of the net drum 50. In the upper portion of the space, the fine pieces and juice are fed into the net drum 50 through the upper net 55. Therefore, in the housing 20, the fine pieces and juice can continuously circulate between the inside and outside of the net drum 50 through the upper and lower nets, so that the juicer can make homogenized mixed juice and the residue can be continuously filtered by the lower net 56 of the net drum, thereby reliably separating the juice from the residue. Further, the residue can be discharged from the housing when necessary. Therefore, the juicer of some embodiments of the present invention can efficiently make smoothies by mixing vegetables or fruits with milk or ice cream. Particularly, the juicer can make soft smoothies having no residue.

Figure 2A:
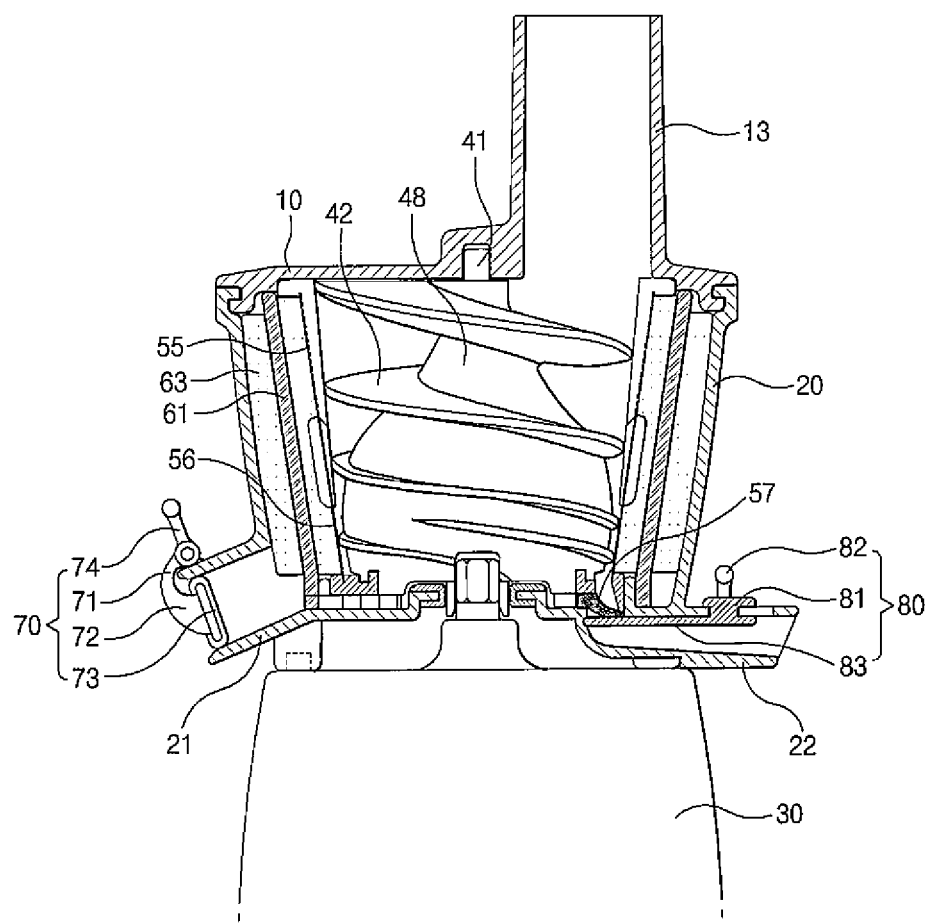
FIG. 2A is a sectional view illustrating a juicer having the smoothie making function according to a second of the present invention.
Figure 2B:
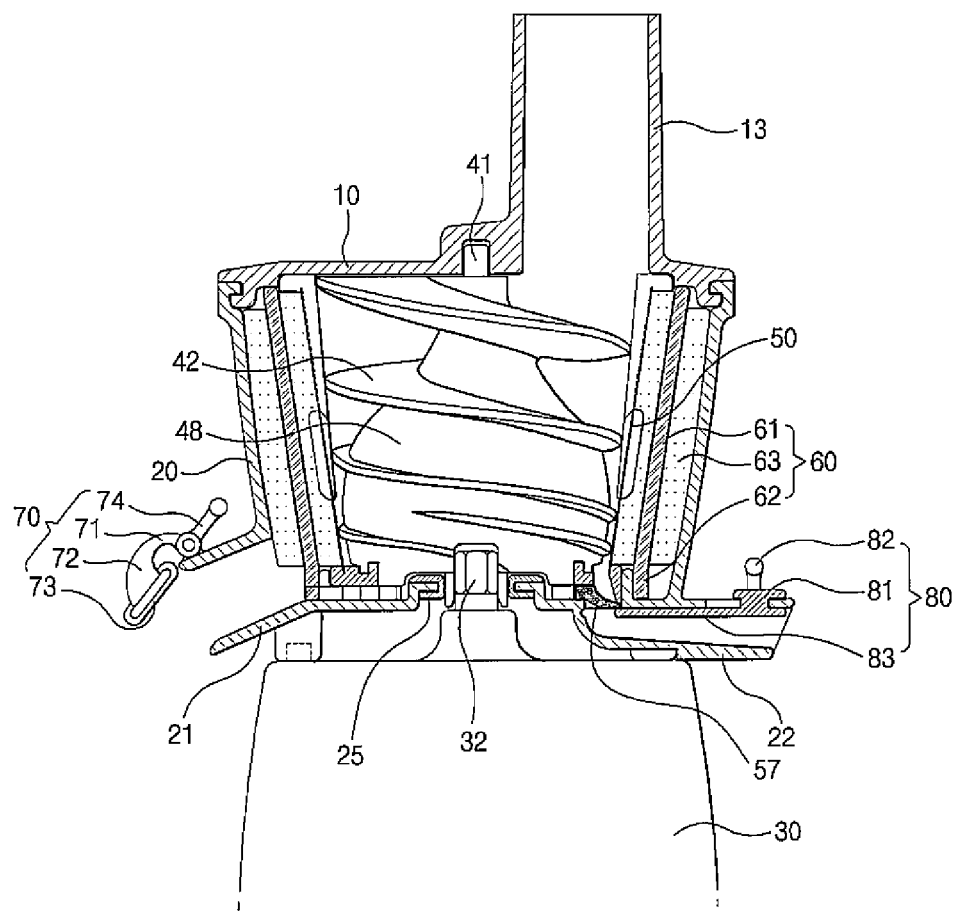
FIG. 2B is a sectional view illustrating the operation of the juicer of FIG. 2A, in which both a juice control unit and a residue control unit are opened.

FIG. 2A is a sectional view illustrating a juicer having a smoothie making function according to another of the present invention. FIG. 2B is a sectional view of the juicer 1 having the smoothie making function shown in FIG. 2A, with both the juice control unit 70 and the residue control unit 80 being opened.

In FIG. 2A, the juice control unit 70 and the residue control unit 80 are closed by the juice outlet 21 and the residue outlet 22, respectively. In FIG. 2B, the juice outlet 21 and the residue outlet 22 have been opened.

First, the residue control unit 80 will be described hereinbelow.

The residue control unit 80 is a unit for opening or closing the residue outlet 22. The residue control unit 80 may be variously embodied if the unit can open or close the residue outlet without affecting the functioning of this of the invention. In some embodiments of the present invention, the residue control unit 80 includes a sliding body 81, a sliding lever 82 and a sliding panel 83, so that the residue control unit 80 can easily and efficiently open or close the residue outlet 22.

The sliding body 81 is mounted to the residue outlet 22 in such a way that the sliding body 81 can slide on the residue outlet 22. To achieve this object, a slit may be formed in the residue outlet 22 and the sliding body 81 may be installed in the slit such that the sliding body 81 can slide along with the slit, as shown in FIG. 2A.

The sliding lever 82 is integrated with the sliding body 81 into a single structure and protrudes outside the residue outlet 22, so that a user can easily control the movement of the sliding body 81 by moving the sliding lever 82 with a hand.

The sliding panel 83 is integrated with the sliding body 81 into a single structure and is movable in the residue outlet 22. The residue outlet 22 may be provided therein with a guide groove (not shown) for guiding movement of the sliding panel 83.

The sliding panel 83 has a basic function of closing the residue outlet 22. However, the sliding panel 83 may be configured to support the residue packing 57.

When the sliding panel 83 is configured to open or close the residue outlet 22, the residue outlet 22 can be closed only by the residue control unit 80. In the above state, the juicer 1 having the smoothie making function according to some embodiments of the present invention may be constructed without the residue packing 57.

When the sliding panel 83 is configured to support the residue packing 57, the residue control unit 80 including the sliding panel 83 may be configured in such a way that the residue control unit 80 does not completely close the residue outlet 22 because the residue packing 57 can prevent discharge of the residue. However, in the above state, the sliding panel 83 is configured to support the residue packing 57 in the state where the sliding panel 83 is in close contact with the lower surface of the residue packing 57. Here, the sliding panel 83 can support the residue packing 57 without leaving any gap between the net drum discharge hole 54 and the residue packing 57.

Figure 3:
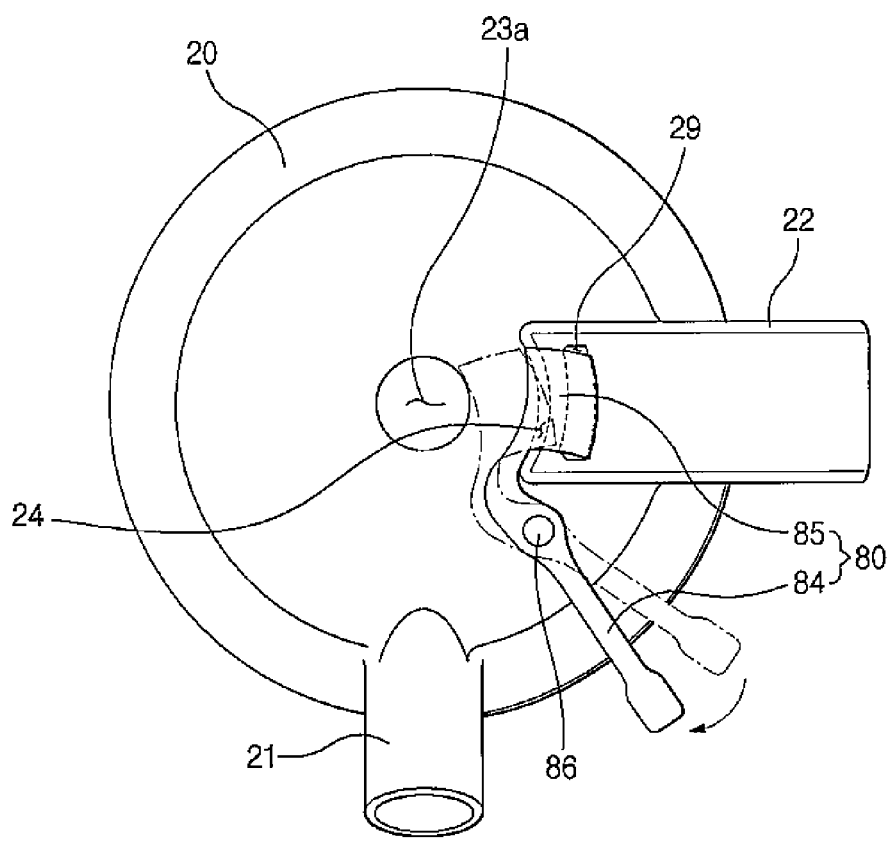
FIG. 3 is a bottom view illustrating a housing used in the juicer of FIG. 1A.
Figure 4A:
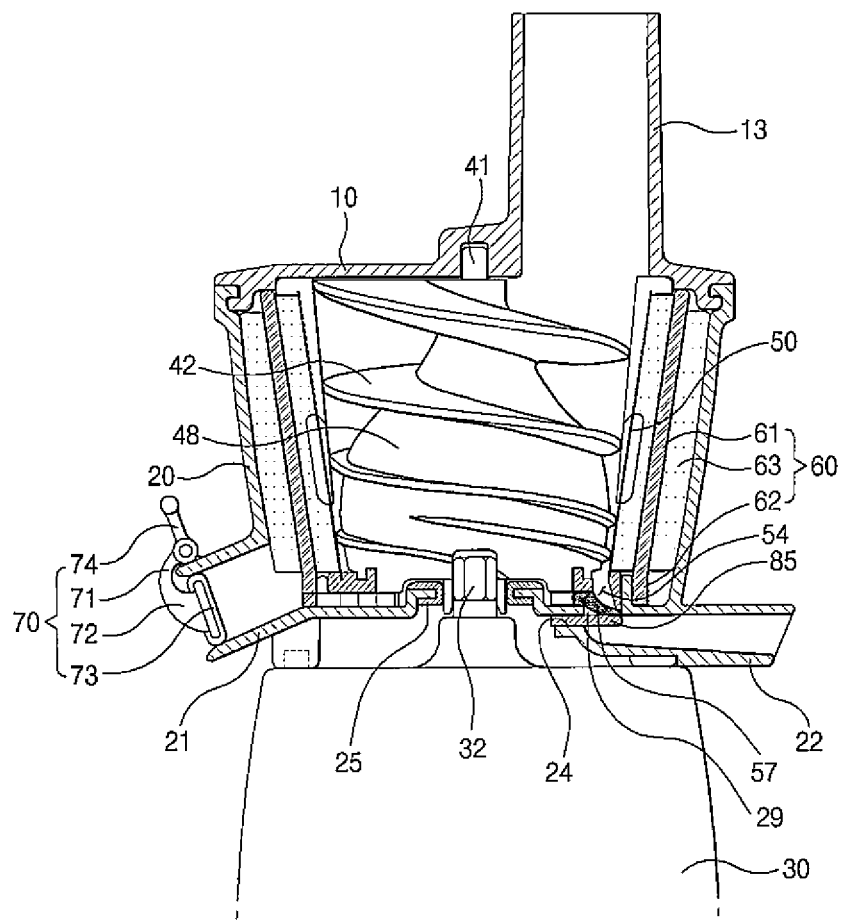
FIGS. 4A through 4D are sectional views illustrating the operation of the juicer shown in FIG. 1A.
Figure 4B:
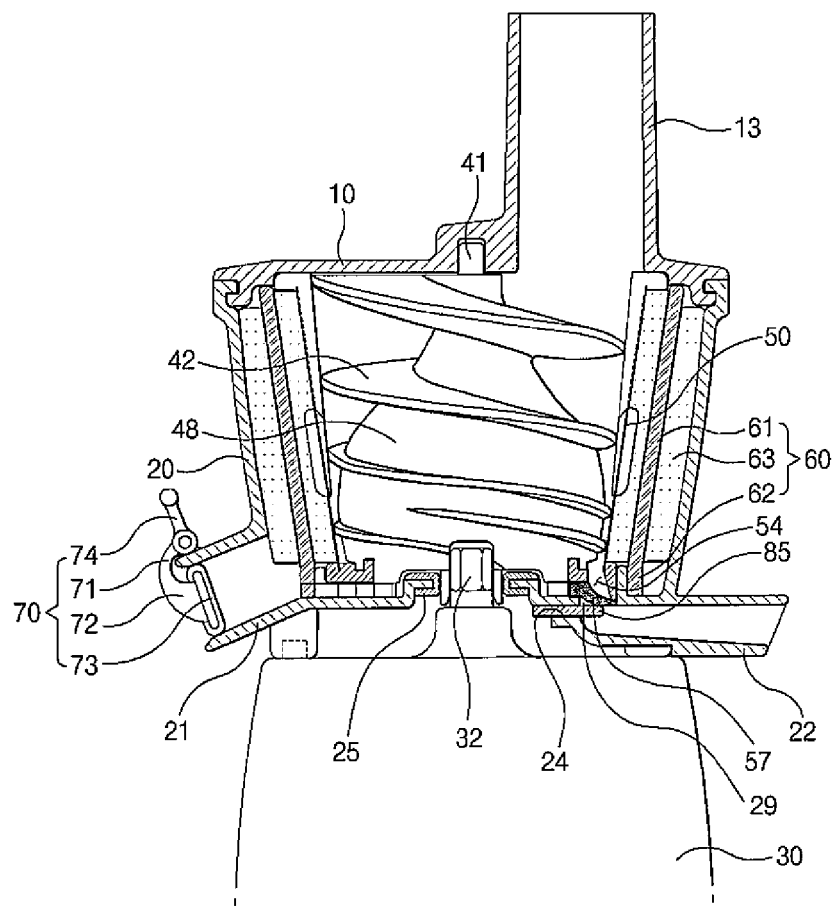
Figure 4C:
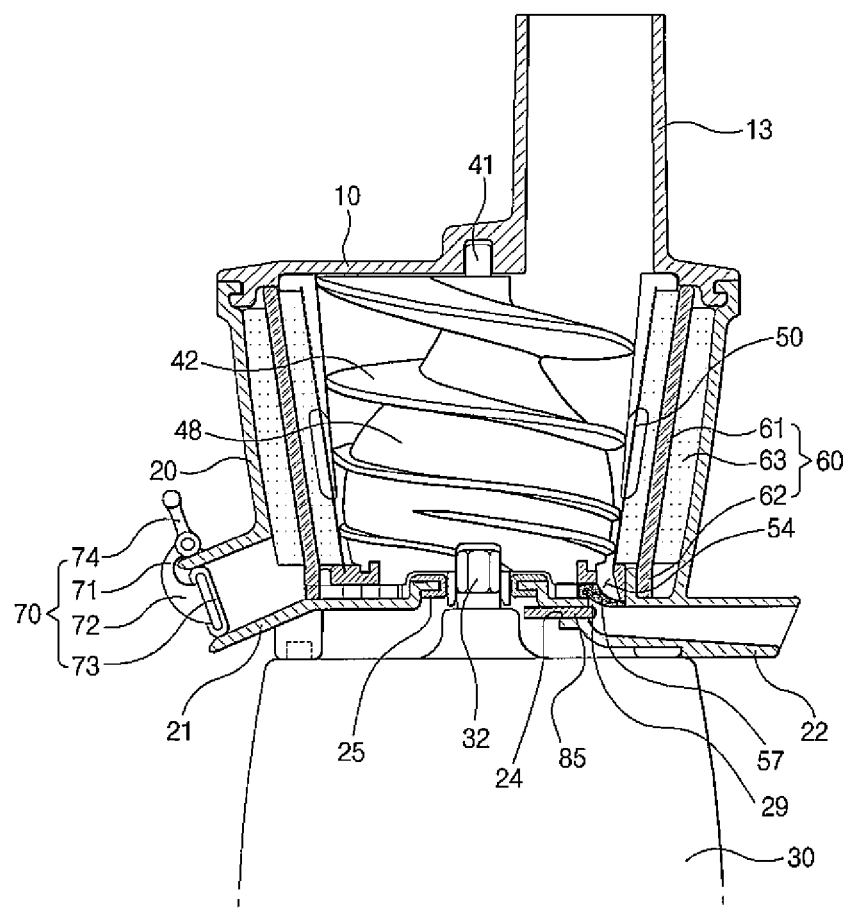
Figure 4D:
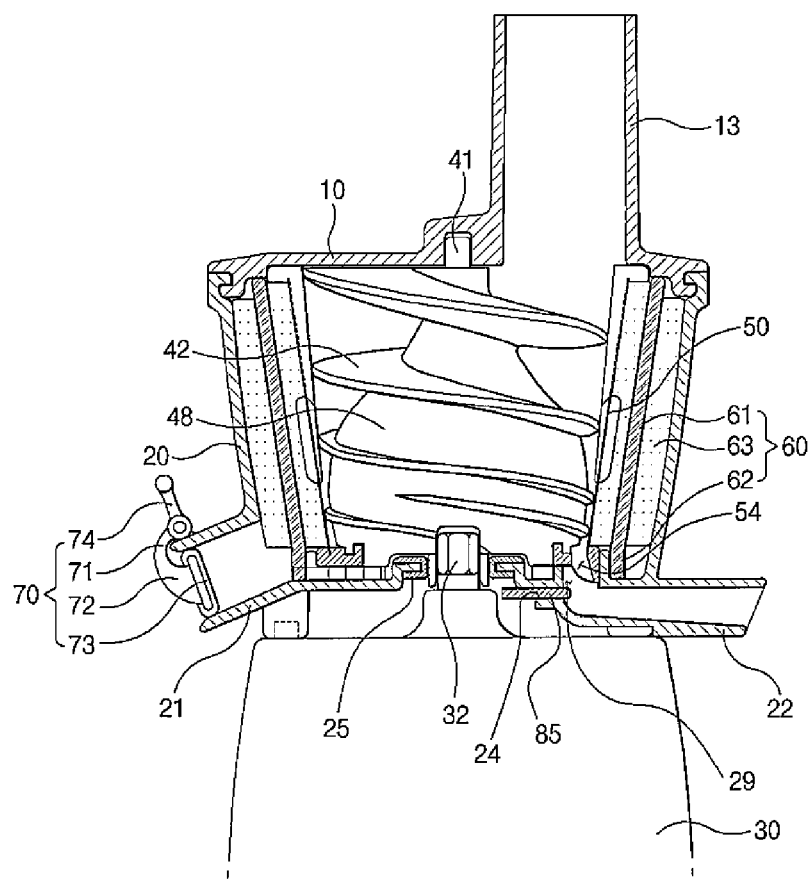
Figure 5A:
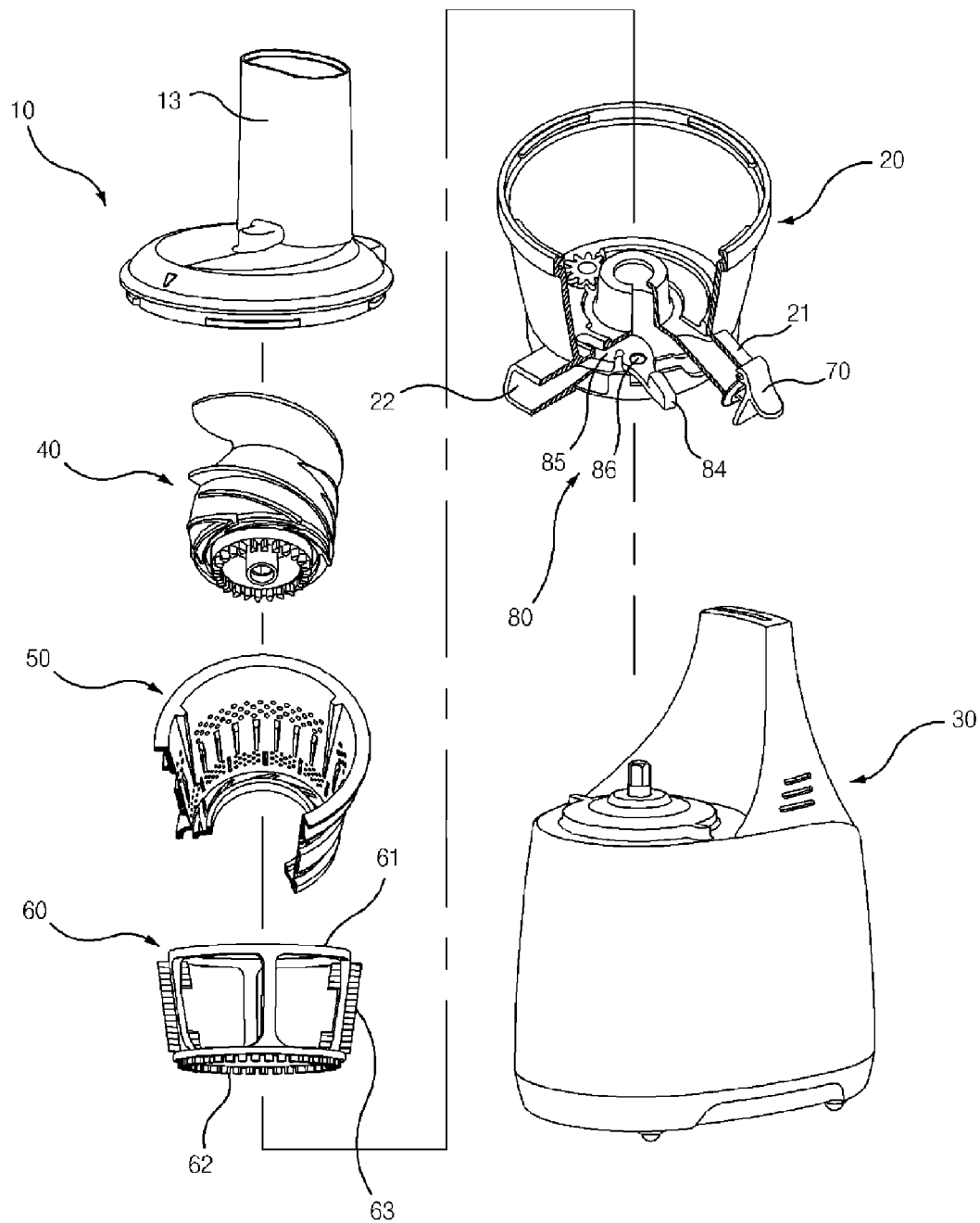
FIG. 5A is an exploded perspective view illustrating a juicer having a smoothie making function according to a third of the present invention.
Figure 5B:
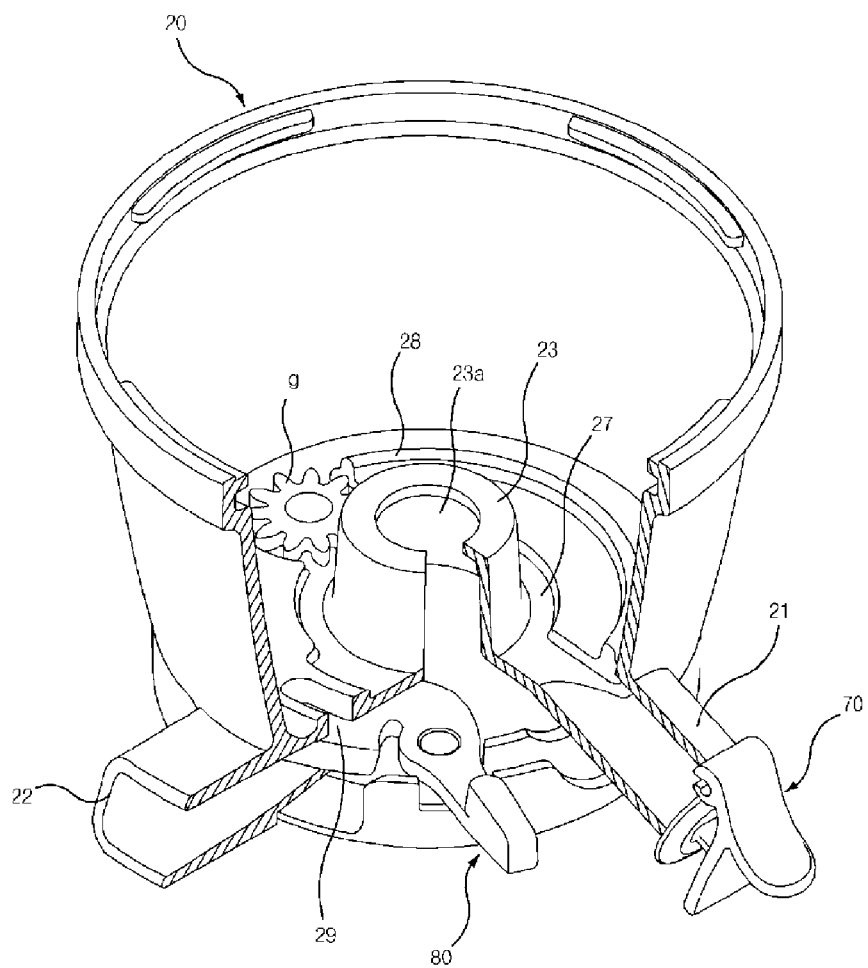
FIG. 5B is a partially sectioned perspective view of a housing used in the juicer of FIG. 5A.
Figure 5C:
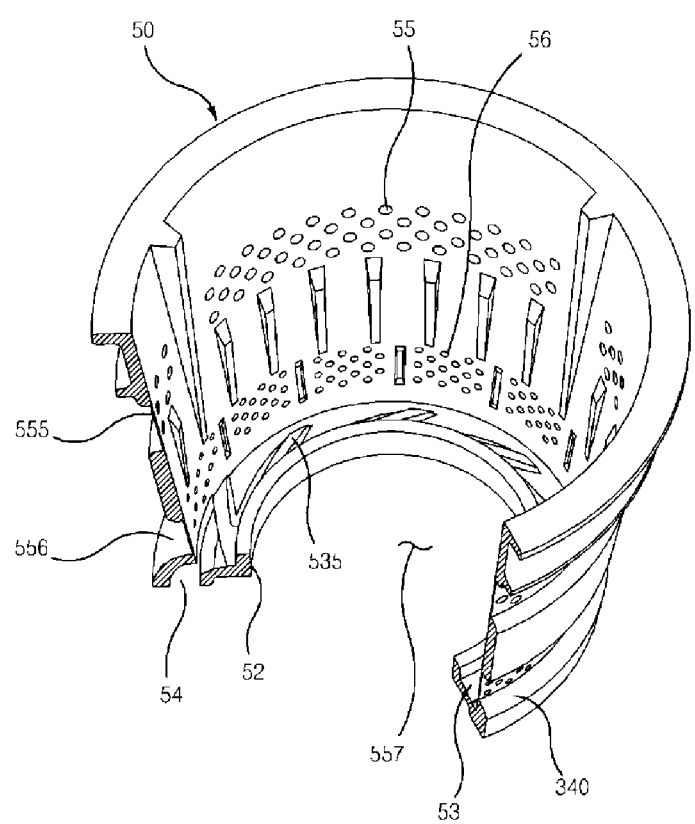
FIG. 5C is a partially sectioned perspective view of a net drum used in the juicer of FIG. 5A.
Figure 5D:
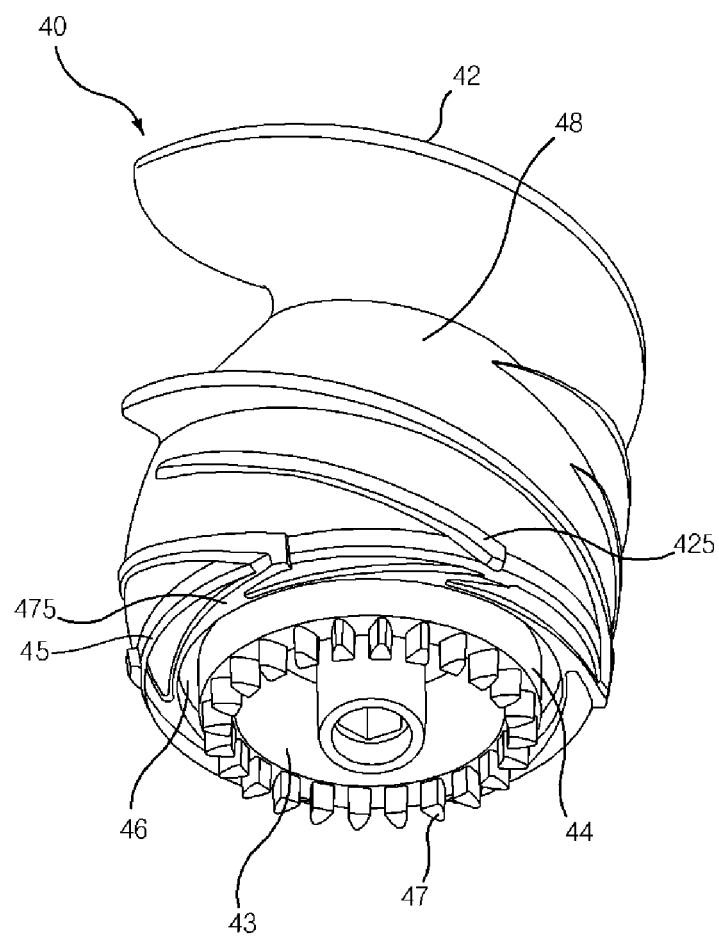
FIG. 5D is a perspective view of a feed screw used in the juicer of FIG. 5A.
Figure 5E:
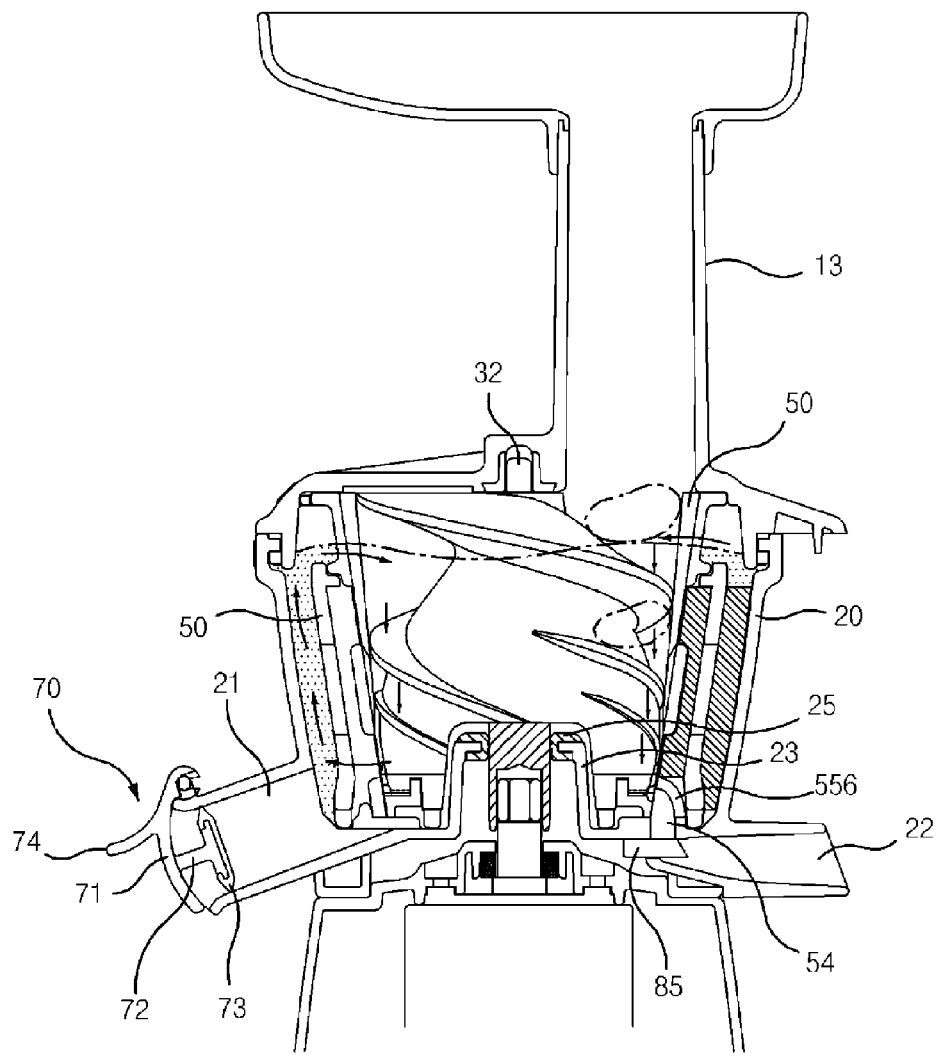
FIG. 5E is a sectional view illustrating the operation of the juicer shown in FIG. 5A.
Figure 6:
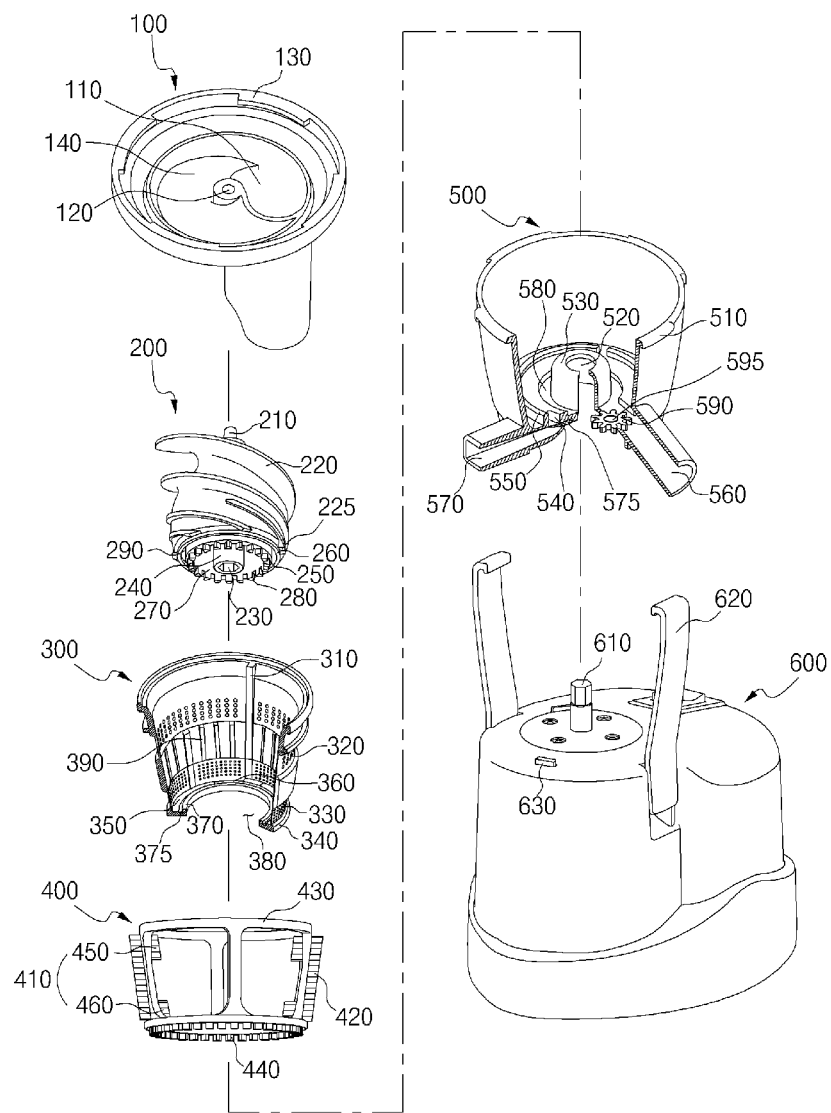
FIG. 6 is an exploded perspective view illustrating a conventional juice extractor.

FIG. 3 is a bottom view of the housing 20 shown in FIG. 1A. FIGS. 4A through 4D are sectional views illustrating the used state of the juicer 1 having the smoothie making function shown in FIG. 1A. Described in detail, FIG. 4A illustrates a state in which the residue control unit 80 completely supports the lower surface of the residue packing 57 such that the residue packing 57 is not deformed. FIG. 4B illustrates a state in which the residue control unit 80 is partially opened and supports a part of the lower surface of the residue packing 57. FIG. 4C illustrates a state in which the residue control unit 80 does not support the residue packing 57. FIG. 4D illustrates a state in which only the residue control unit 80 is operated without the residue packing 57.

FIG. 3 illustrates the operation of the residue control unit 80 according to the first of the present invention which is different from the shown in FIGS. 2A and 2B. In FIG. 3, the residue outlet 22 is shown in a sectioned state, with the juice control unit 70 not being illustrated.

The residue control unit 80 functions to open or close the residue path. Described in detail, the residue control unit 80 functions to open or close the net drum discharge hole 54 or the housing discharge hole 29. The residue control unit 80 may be variously embodied if the unit 80 can open or close the residue path without affecting the functioning of some embodiments of this invention.

The residue control unit 80 may be configured to open or close the net drum discharge hole 54 in a state in which the unit 80 is in close contact with the lower end of the net drum discharge hole 54. In some embodiments, the residue control unit 80 may be configured to open or close the housing discharge hole 29 or the residue outlet 22. Further, the residue control unit 80 may be configured in such a way that it can support the residue packing 57 and thereby can close the net drum discharge hole 54 without being put in close contact with the lower end of the net drum discharge hole 54.

Here, in some embodiments, the residue control unit 80 includes a control lever 84 and a rotary panel 85 which can open or close the net drum discharge hole 54 in response to a rotating motion of the control lever 84.

Further, the rotary panel 85 is inserted into the residue outlet 22 and opens or closes the lower end of the net drum discharge hole 54, with an adjustment hole 24 being formed at a predetermined position in the residue outlet 22. The size of the adjustment hole 24 is sufficient as long as it permits a slidable insertion of the rotary panel 85. That is, the size of the adjustment hole 24 may be equal to or greater than the sectional area of the rotary panel 85.

Further, as shown in FIG. 3, the adjustment hole 24 may be formed on the rear end of the residue outlet 22.

The rotary lever 84 is mounted to the bottom of the housing 20 in such a way as to rotate around a rotating shaft 86. The end of the rotary lever 84 protrudes further from the sidewall of the housing 20, thus allowing a user to easily grasp and manipulate it. While the rotary panel 85 is repeatedly inserted into or pulled out of the residue outlet 22 through the adjustment hole 24 by the manipulation of the rotary lever 84, the net drum discharge hole 54 or the housing discharge hole 29 is closed or opened.

The basic function of the rotary panel 85 is to close the residue path. However, the rotary panel 85 may be configured to support the residue packing 57.

When the rotary panel 85 is configured to open or close the residue path, the net drum discharge hole 54 can be closed only by the residue control unit 80. In such a state, the juicer 1 having the smoothie making function according to some embodiments of the present invention may be constructed without the residue packing 57.

When the rotary panel 85 is configured to support the residue packing 57, the residue control unit 80 including the rotary panel 85 may be configured in such a way that the residue control unit 80 does not completely close the net drum discharge hole 54 because the residue packing 57 can prevent the residue from being discharged. However, in the above state, the rotary panel 85 is configured to support the residue packing 57 in a state in which the rotary panel 85 comes into close contact with the lower surface of the residue packing 57. Here, the rotary panel 85 can support the residue packing 57 without there being any gap between the net drum discharge hole 54 and the residue packing 57.

As described above, the residue control unit 80 is provided on the residue outlet 22 such that the unit 80 opens or closes the residue path. Here, the residue control unit 80 is selectively used depending on whether it is necessary to continuously discharge juice and residue, whether it is necessary to make smoothies or whether it is necessary to wash the juicer.

Further, the residue control unit 80 controls a support degree while supporting the lower surface of the residue packing 57, thus reliably closing the residue outlet 22 and continuously discharging a proper amount of residue depending on requirements.

The case having the residue packing 57 will be described. First, one end of the residue packing 57 is mounted to an end of the net drum discharge hole 54 while the other end of the packing 57 is configured in the form of a free end. Further, the residue packing 57 may be configured such that the packing 57 comes into close contact with the lower end of the net drum discharge hole 54 or with the inner surface of the hole 54. For sake of description, the end of the residue packing 57 at which the packing 57 is mounted to the net drum discharge hole 54 will be referred to as the rear end thereof and the free end of the residue packing 57 will be referred to as the front end thereof.

When both the feed screw 40 and the net drum 50 are operated along with the screw pump and residue pressure is applied to the upper surface of the residue packing 57, the fixed end of the residue packing 57 maintains a fixed state but the free end is pressed to be bent, so that the net drum discharge hole 54 is opened.

The residue packing 57 allows the residue to be discharged in the case where the residue is pressed by the feed screw 40, and maintains a sealed state in the case where a substance other than the residue, for example, water is not pressed by the feed screw 40.

That is, the residue packing 57 prevents the residue containing some juice from being discharged out. That is, the residue packing 57 sufficiently presses the residue to completely separate juice from the residue, and thereafter discharges the residue.

Here, the rotary panel 85 moves from the rear end to the front end of the residue packing 57. The degree to which the lower surface of the residue packing 57 is supported varies depending on the degree of movement. That is, the degree to which the rotary panel 85 supports the residue packing 57 may be controlled by adjusting the rotary lever 84.

For example, in the case of using a watery and soft material, the rotary panel 85 does not support the residue packing 57 or slightly supports the residue packing 57. In contrast, in the case of using a strong and tough material, it is required to use a relatively rigid residue packing 57. Thus, the rotary panel 85 may be adjusted to sufficiently support the residue packing 57, so that a compressive force suitable for extracting juice may be provided depending on the type of input material.

As such, the movement of the discharged residue is primarily suppressed by the residue packing 57, and is secondarily suppressed by the residue control unit 80, thus preventing insufficiently compressed residue from being discharged (in a state in which juice is not sufficiently extracted from the residue).

Further, the residue control unit 80 may be opened or closed by simple manipulation. When the residue control unit 80 is closed, the residue path is closed and prevented from opening. Moreover, the residue control unit 80 supports the lower surface of the residue packing 57, and efficiently prevents the residue outlet 22 from being opened in cooperation with the residue packing 57, thus realizing an excellent sealing effect.

Hereinbelow, the juice control unit 70 will be described.

The juice control unit 70 functions to open or close the juice outlet 21 and may be configured in the form of a service water valve or a valve of a hot and chilled water generator. In some embodiments of the present invention, the juice control unit 70 is appropriately constructed to realize the easy control of the juice outlet 21 and to realize the easy washing and cleaning of the juicer used as a smoothie maker which is a food processing apparatus. Hereinbelow, the juice control unit 70 will be described in detail.

The juice control unit 70 includes a rotary unit 71 rotatably connected to the juice outlet 21, and a closure unit 72 provided at a side of the rotary unit 71 and functioning to open or close the end of the juice outlet 21.

The rotary unit 71 is a part, at which the juice control unit 70 is connected to the juice outlet 21, and is configured such that the juice control unit 70 can be rotated in the juice outlet 21 by the rotary unit 71. The rotary unit 71 may be constructed in the form of a typical hinge device so that the rotary unit 71 can be rotated around a shaft. The rotary unit 71 will be described in detail later herein.

The closure unit 72 is a part which selectively prevents juice from being discharged through the juice outlet 21. The closure unit 72 is provided with a closure packing 73 in an end thereof. In some embodiments, the closure unit 72 may be integrated with the rotary unit 71 into a single structure. Further, the closure unit 72 is configured such that the closure packing 73 can be mounted thereto.

The closure packing 73 is made of an elastic material, such as rubber or silicone, and is mounted to the end of the closure unit 72. Further, the closure packing 73 is configured such that it can close the juice outlet 21 and can come into close contact with the inner or outer surface of the juice outlet 21.

The closure packing 73 shown in FIG. 2A is a type in which the packing 73 comes into close contact with the inner surface of the juice outlet 21. Unlike this type, the closure packing 73 may be configured in the form of a cap having a diameter larger than that of the end of the juice outlet 21, so that the closure packing 73 can come into close contact with the outer circumferential surface of the juice outlet 21 while surrounding the end of the juice outlet 21.

Here, when the closure packing 73 is configured to come into close contact with the inner circumferential surface of the juice outlet 21, the packing 73 may have an outer diameter slightly larger than the inner diameter of the juice outlet 21. On the contrary, when the closure packing 73 is configured to come into close contact with the outer circumferential surface of the juice outlet 21, the packing 73 may have an inner diameter slightly smaller than the outer diameter of the juice outlet 21. Therefore, when the closure packing 73 is fitted into or over the juice outlet 21, the packing 73 is elastically deformed and reliably closes the juice outlet 21.

A lever 74 is provided at a location opposed to the closure unit 72 based on the rotary unit 71 and functions to rotate the closure unit 72. The lever 74 is configured to allow a user to hold it and may be provided with an uneven surface for preventing the hand from slipping off.

The rotary unit 71 may be mounted to the upper, lower, left-side or right-side portion of the juice outlet 21. However, to realize the easy opening or closing of the closure unit 72, the rotary unit 71 may be mounted to the upper portion of the juice outlet 21, as described above.

When the juice control unit 70 is constructed using the rotary unit 71 and the closure unit 72, as described above, the rotary unit 71 and the closure unit 72 can be rotated on the juice outlet 21 in an integrated state, so that the juice control unit 70 can be easily manipulated without the juice control unit 70 being lost. Further, the lever 74 in addition to the rotary unit 71 and the closure unit 72 is provided in the juice control unit 70, thus making it easier to manipulate the juice control unit 70.

FIGS. 5A through 5E illustrate a juicer having a smoothie making function according to a further of the present invention, in which a net drum discharge hole 54 for discharging residue from a net drum 50 is formed in the sidewall 555 of the lower portion of the net drum 50 in such a way that the net drum discharge hole 54 communicates with a residue outlet 22, with a residue control unit 80 provided in the juicer and opening or closing the net drum discharge hole 54 or the residue outlet 22.

In the embodiments of FIGS. 5A through 5E, the same elements as those of the embodiments shown in FIGS. 1 through 4D will carry the same reference numerals.

In the lower surface of a feed screw 40, a circular protrusion insert channel 46 is formed around an inner ring 44 and receives therein a circular protrusion 52 of the net drum 50, with an outer ring 45 formed around the circular protrusion insert channel 46.

In the feed screw 40, a screw discharge step 425 is formed on the lower end of each lower screw blade. The screw discharge step 425 functions to discharge the residue that has moved to the lower end of the net drum 50 to outside of the net drum 50 through the net drum discharge hole 54 formed in the net drum sidewall 555.

The screw discharge step 425 may be rapidly inclined downwards from the lower end of the screw blade. Because the screw discharge step 425 is rapidly inclined downwards from the lower end of the lower screw blade, the screw discharge step 425 can efficiently push the residue to the net drum discharge hole 54 with increased force.

In the lower end of the net drum 50, a bottom ring 340 defining the inner-ring insert hole 557 therein is formed in such a way that the inner ring 44 of the feed screw 40 can be inserted into the inner-ring insert hole 557. The bottom ring 340 forms the bottom surface of the net drum 50. The net drum discharge hole 54 is formed in the lower portion of the net drum sidewall 555 and communicates with the residue outlet 22.

At a location around the net drum discharge hole 54, a discharge guide surface 556 that is bent downwards is mounted to a predetermined lower portion of the outer surface of the net drum 50. The discharge guide surface 556 forms a channel, through which the net drum discharge hole 54 communicates with a housing discharge hole 29 formed in the bottom of a housing 20.

In the feed screw 40, a plurality of screw-bottom discharge steps 475 are formed by protruding from the lower surface of the feed screw 40 in such a way that each of the steps 475 extends from the inside to the outside and the outer ends of the steps 475 continuously form the rear ends thereof based on the rotating direction of the feed screw 40. Further, in the net drum 50, a plurality of net drum bottom-ring discharge steps 535 are formed by protruding from the bottom surface of the circular groove 53 formed in the net drum bottom ring 340 in such a way that each of the steps 535 extends from the inside to the outside and the outer ends of the steps 535 continuously form front ends thereof based on the rotating direction of the feed screw 40. Therefore, when the feed screw 40 is rotated, the net drum bottom-ring discharge steps 535 and the screw-bottom discharge steps 475 intersect with each other and, accordingly, residue stuck to a portion adjacent to the net drum bottom ring 340 is forced out along the net drum bottom-ring discharge steps 535 by the screw-bottom discharge steps 475, thus being moved to the net drum discharge hole 54 and being discharged from the net drum 40 through the net drum discharge hole 54.

In some embodiments of the present invention, the net drum discharge hole 54 is formed in the lower portion of the sidewall 555 of the net drum 50 and the screw discharge steps 425 are formed on the lower portions of the side surfaces of the respective screw blades, so that the residue can be discharged through the net drum discharge hole 54 formed in the sidewall of the net drum 50. Because the net drum discharge hole 54 is formed in the lower portion of the net drum 50, the gap formed between the net drum discharge hole 54 and the screw discharge steps 425 may be gradually enlarged by the accumulated fiber during a process of extracting juice from vegetables or fruits having lots of tough fiber, and, occasionally, the feed screw 40 may be pushed upwards and, accordingly, the operation of the feed screw 40 may be suddenly stopped. However, in some embodiments of the present invention, even when a material having lots of tough fiber is put into the juicer and the feed screw 40 is slightly pushed upwards by the material, tough fiber residue can be easily discharged through the net drum discharge hole 54 without being accumulated therein. In other words, the no substantial space left between the screw discharge steps 425 formed on the side surfaces of the screw blades 42 and the lower sidewall of the net drum in which tough fiber residue may be collected because the gap defined between the screw discharge steps 425 and the lower sidewall of the net drum is too small and, further, the screw discharge steps 425 can cut the tough fiber residue while passing by the inlet of the net drum discharge hole 54, so that the tough fiber residue can be easily discharged through the net drum discharge hole 54 without accumulating therein.

Further, in the feed screw 40 of some embodiments of the present invention, a plurality of screw-bottom discharge steps 475 are formed by protruding from the lower surface of the feed screw 40 in such a way that each of the steps 475 extends from the inside to the outside and the outer ends of the steps 475 continuously form the rear ends thereof based on the rotating direction of the feed screw 40. Further, in the net drum 50, a plurality of net drum bottom-ring discharge steps 535 are formed by protruding from the bottom surface of the circular groove 53 formed in the net drum bottom ring 340 in such a way that each of the steps 535 extends from the inside to the outside and the outer ends of the steps 535 continuously form front ends thereof based on the rotating direction of the feed screw 40. Therefore, when the feed screw 40 is rotated, the net drum bottom-ring discharge steps 535 and the screw-bottom discharge steps 475 intersect with each other and, accordingly, residue stuck to a portion adjacent to the net drum bottom ring 340 is forced out along the net drum bottom-ring discharge steps 535 by the screw-bottom discharge steps 475, thus being moved to the net drum discharge hole 54 and being discharged from the net drum 40 through the net drum discharge hole 54.

As described above, when the juicer having the smoothie making function according to some embodiments of the present invention is operated in a state in which the juice outlet is closed by the juice control unit, the feed screw having the rotating shaft is rotated by the drive shaft in a state in which the feed screw is placed in the net drum having the entirely or partially meshed sidewall. Therefore, the feed screw moves the input food downwards while cutting, crushing and squeezing the food, thereby producing fine pieces and juice. The fine pieces and juice, which are produced by the operation of both the feed screw and the net drum operated in conjunction with the screw pump, are continuously fed to the space defined between the inner surface of the housing and the outer surface of the net drum through the lower net of the net drum and move downwards. Further, the fine pieces and juice move upwards from the lower portion in the space defined between the inner surface of the housing and the outer surface of the net drum. In the upper portion of the space, the fine pieces and juice are fed into the net drum through the upper net. Therefore, in the housing, the fine pieces and juice can continuously circulate between the inside and outside of the net drum through the upper and lower nets, so that the juicer can make a uniformly mixed juice and the residue can be continuously filtered by the lower net of the net drum, thereby reliably separating the juice from the residue. Further, the residue can be discharged from the housing when necessary. Therefore, the juicer of some embodiments of the present invention can efficiently make smoothies by mixing vegetables or fruits with milk or soybean milk. Particularly, the juicer can make soft smoothies having no residue.

Further, in some embodiments of the present invention, the residue packing is mounted to the power end of the net drum, so that, when the net drum is separated from the housing, the residue packing is removed along with the net drum from the housing, thereby being easily washed and cleaned.

In some embodiments of the present invention, the residue control unit for opening or closing the residue discharge path is provided, so that the residue control unit can be selectively used according to the case in which it is necessary to continuously discharge juice and residue and to the case in which it is necessary to make smoothies, and to the case in which it is necessary to wash the juicer having the smoothie making function.

In some embodiments of the present invention, the net drum discharge hole is formed in the lower portion of the net drum sidewall and the discharge steps are formed on the side surfaces of the screw blades of the feed screw, so that the residue can be discharged through the sidewall of the net drum. Therefore, unlike the embodiments in which the net drum discharge hole is formed in the lower end of the net drum and, accordingly, the gap defined between the net drum discharge hole and the screw discharge steps is enlarged by the accumulated fiber residue during a process of extracting juice from vegetables or fruits having lots of tough fiber, some embodiments of the present invention are advantageous in that, even when a material having lots of tough fiber is put into the juicer and the feed screw is slightly pushed upwards by the material, tough fiber residue can be easily discharged through the net drum discharge hole without accumulating therein. In other words, no space sufficiently big enough for tough fiber residue to collect inside of is formed between the screw discharge steps formed on the side surfaces of the screw blades and the lower sidewall of the net drum because the gap defined between the screw discharge steps and the lower sidewall of the net drum is too small and, further, the screw discharge steps can cut the tough fiber residue while passing by the inlet of the net drum discharge hole, so that the tough fiber residue can be easily discharged through the net drum discharge hole without being accumulated therein.

Further, in some embodiments of the present invention, at a location around the net drum discharge hole, the discharge guide surface that is bent downwards is mounted to the predetermined lower portion of the outer surface of the net drum. This discharge guide surface forms a channel, through which the net drum discharge hole communicates with the housing discharge hole formed in the bottom of the housing. Due to the net drum discharge guide surface, the residue can be easily discharged through the housing discharge hole.

Further, the juicer having the smoothie making function according to some embodiments of the present invention is provided with the control lever for controlling the opening ratio of the residue outlet, so that the juice extraction rate can be controlled by manipulating the control lever.

Further, in some embodiments of the present invention, the residue packing for opening or closing the residue discharge path is provided on the lower surface of the net drum, thereby easily opening or closing the residue outlet. Further, the lower surface of the residue packing can be closely supported by the residue control unit, so that the opening ratio of the residue packing can be controlled and, accordingly, it is possible to reliably seal the residue outlet or to continuously discharge an appropriate amount of residue through the residue outlet.

Further, in some embodiments of the present invention, the brush promotes the circulation of smoothies between the interior and exterior of the net drum. Further, when it is required to wash the juicer, water can be fully charged in the net drum by closing the juice outlet, so that the interior elements of the juicer having the smoothie making function can be easily and simply washed by rotating both the feed screw and the brush in the juicer without disassembling the juicer.

Further, in some embodiments of the present invention, the brush is rotated in conjunction with the intermediate gear that is rotated by the secondary shaft, so that the rotating speed of the brush can be controlled separately from the rotating speed of the drive shaft so that it appropriately suits the kinds of vegetable or fruit.

Further, in some embodiments of the present invention, the juicer having the smoothie making function is provided with the juice control unit including the rotary unit and the closure unit which are integrated with each other into a single structure, so that the juice control unit can be rotated in an integrated state on the juice outlet and, accordingly, it is easy to manipulate the juice control unit without losing the elements of the juice control unit.

Although some embodiments of the present invention has been described for illustrative purposes, those skilled in the art will appreciate that various modifications, additions and substitutions are possible, without departing from the scope and spirit of the invention as disclosed in the accompanying claims.

What is claimed is:

1. A juicer having a smoothie making function, comprising:
   a lid having a feed tube for putting food into the juicer;
   a feed screw for feeding the input food downwards while cutting, crushing and squeezing the food, with a rotating shaft an upper end of which being supported by the lid while a lower end of the rotating shaft is connected to a drive shaft in such a way that the rotating shaft is vertically provided in the feed screw;
   a housing assembled to a lower end of the lid, with a juice outlet and a residue outlet being formed on an outer surface of the housing in such a way that the juice outlet and the residue outlet are spaced apart from each other, the feed screw being rotatably placed in the housing and a housing discharge hole being formed in a bottom of the housing such that the housing discharge hole communicates with the residue outlet;
   a net drum having an upper net in an upper portion thereof and a lower net in a lower portion thereof and surrounding the feed screw with a net drum discharge hole being formed in the net drum and communicating with the residue outlet in a such way the net drum separates a inner space of the housing into two parts such that a space defined outside the net drum communicates with the juice outlet and a space defining an interior of the net drum communicates with the residue outlet;
   a motor unit provided with a seat on an upper end thereof for seating the housing thereon, with the drive shaft provided in a center of the seat and connected to the rotating shaft, thereby rotating the feed screw;
   a juice control unit for opening or closing the juice outlet, wherein the net drum discharge hole is formed in a lower surface of the net drum; and
   a residue control unit for opening or closing the net drum discharge hole or the residue outlet such that with the juice outlet being closed, food repeatedly and continuously circulates through the upper net and the lower net of the net drum while being cut, crushed or squeezed.

2. The juicer having the smoothie making function as set forth in claim 1, further comprising:
a brush installed between the housing and the net drum and rotated in conjunction with the feed screw and brushing an inner surface of the housing or an outer surface of the net drum.

3. The juicer having the smoothie making function as set forth in claim 1, further comprising:
a brush installed between the housing and the net drum and rotated in conjunction with an intermediate gear rotated by a secondary shaft connected to the motor unit such that the rotating speed of the brush is controlled separately from the rotating speed of the drive shaft.

4. The juicer having the smoothie making function as set forth in claim 1, wherein the juice control unit comprises:
a rotary unit rotatably connected to the juice outlet; and
a closure unit provided in an end of the rotary unit and configured to close an end of the juice outlet.

5. The juicer having the smoothie making function as set forth in claim 1, wherein
the residue outlet is provided with an adjustment hole at a location adjacent to the net drum discharge hole, and
the residue control unit comprises:
a control lever rotatably mounted to a lower surface of the housing; and
a rotary panel extending from the control lever and inserted in the adjustment hole so as to open or close the net drum discharge hole or the residue outlet.

6. The juicer having the smoothie making function as set forth in claim 5, wherein
the net drum discharge hole is provided with a residue packing, the residue packing being configured to be elastically deformed and opening or closing the net drum discharge hole, and
the rotary panel comes into close contact with a lower surface of the residue packing, thereby controlling elastic deformation of the residue packing.

* * * * *